April 5, 1938.   J. C. EAHEART   2,113,342
BRAKE EQUALIZING DEVICE
Filed April 26, 1935   3 Sheets-Sheet 3

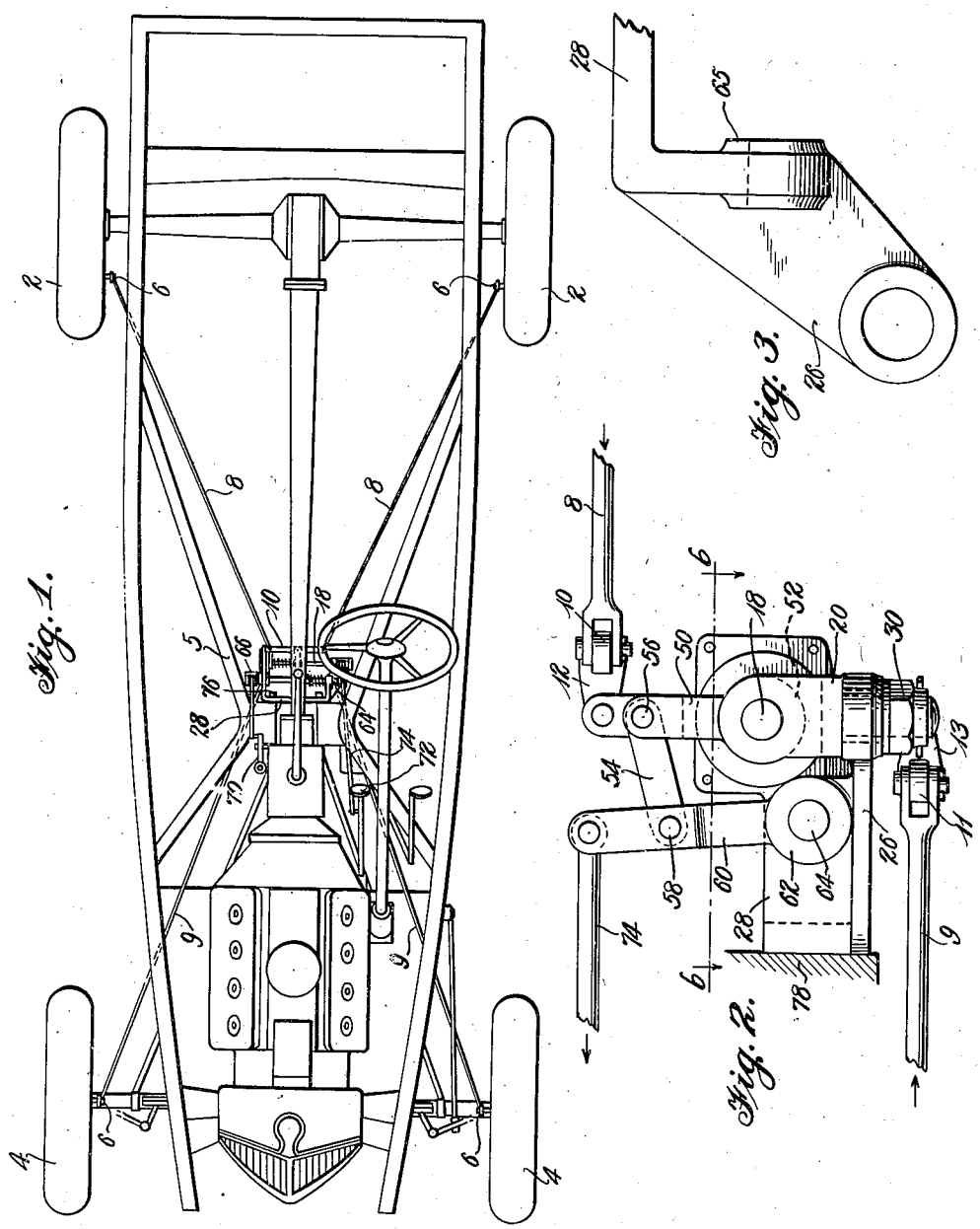

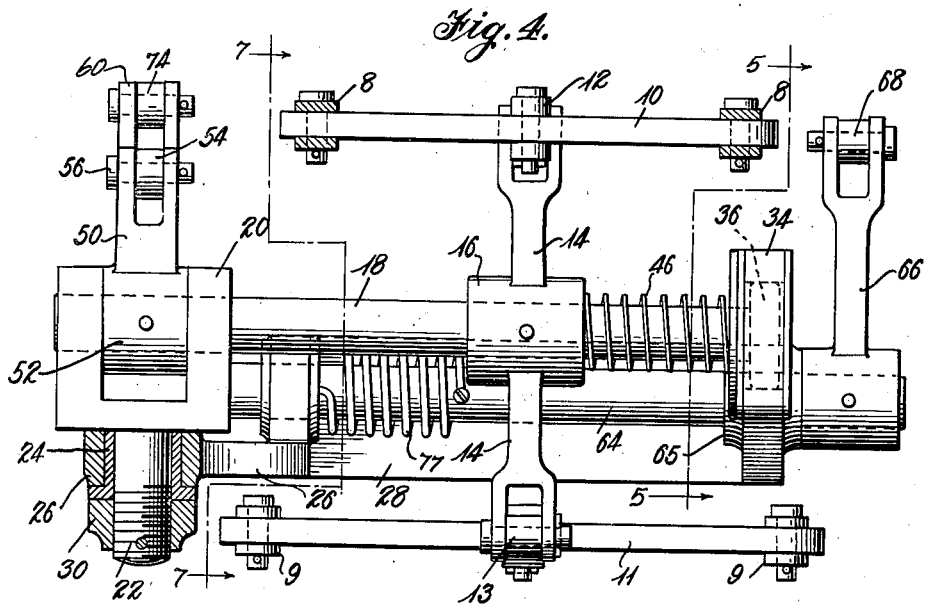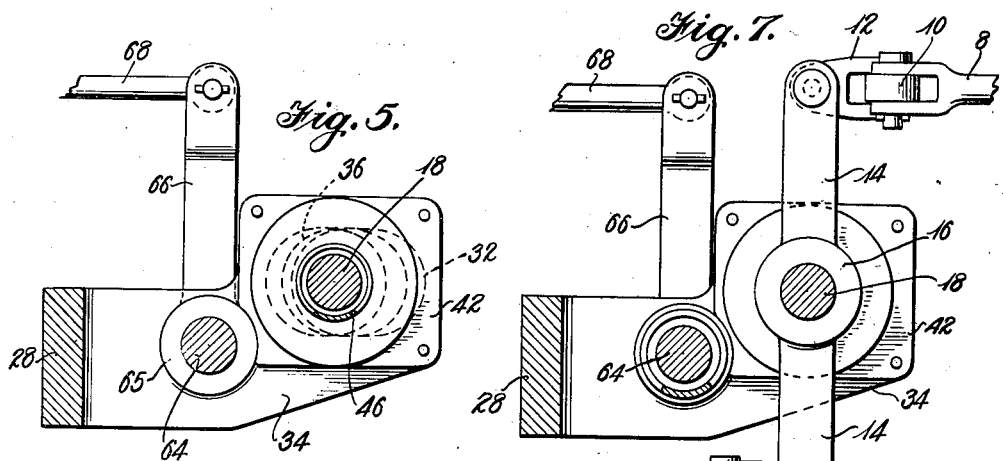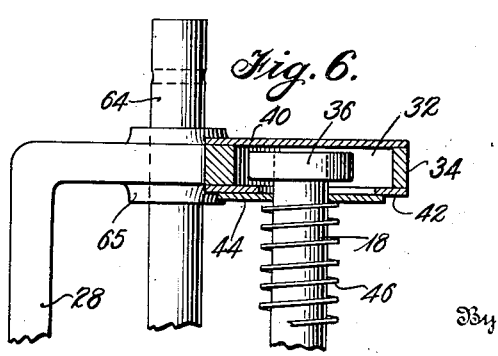

Inventor
J. C. Eaheart

By Knight Bros
His Attorneys

Patented Apr. 5, 1938

2,113,342

UNITED STATES PATENT OFFICE 2,113,342

BRAKE EQUALIZING DEVICE

Joseph C. Eaheart, Richmond, Va.

Application April 26, 1935, Serial No. 18,443

1 Claim. (Cl. 188—204)

This invention relates to equalizers for four-wheel brakes.

The principal object of the invention is to provide a device of this kind in which damage to one part of the system will leave either two front wheel brakes or two rear wheel brakes in operation. The part of the brake system most subject to damage is that associated with the front wheels. In case of such damage, my brake operating system will act as a simple rear wheel brake mechanism. In case of damage to the rear wheel brake system, the front wheel brake mechanism remains operative and equalized as between the two front wheel brakes. While front wheel brakes acting alone are less desirable than rear wheel brakes acting alone, both are more desirable than one front and one rear wheel brake on only one side acting alone.

A particular object of the invention is to provide an equalizing mechanism of compact structure adapted to fit within the limited space available under the modern low-swung car.

Figure 8:
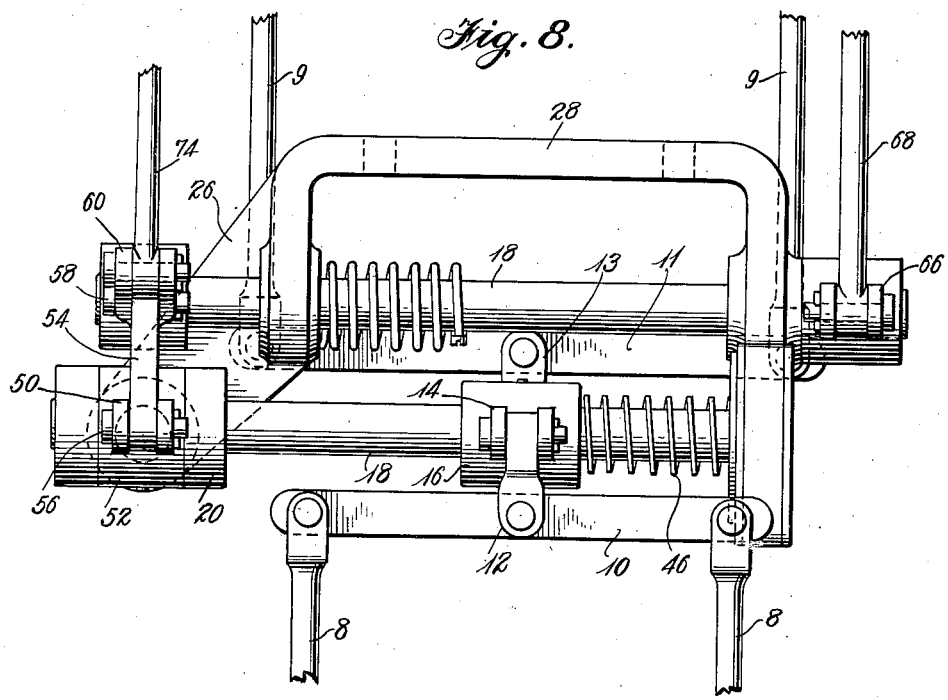
Figure 9:
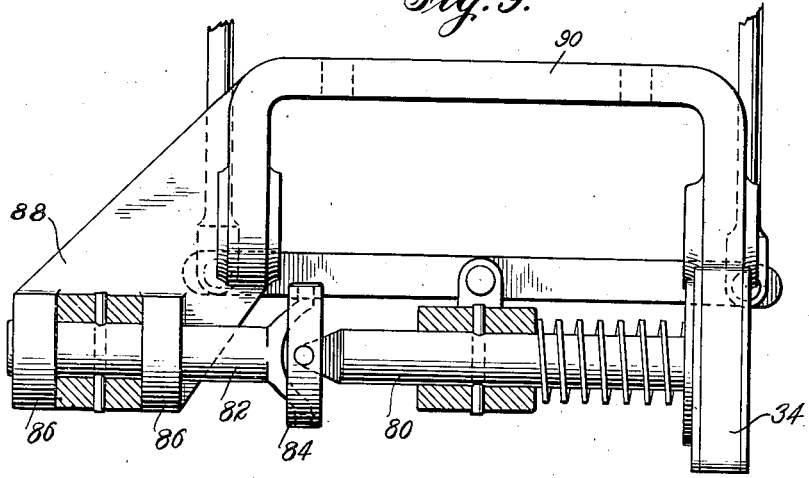

The invention will be further explained with reference to illustrative embodiments shown in the accompanying drawings, wherein, Fig. 1 is a plan view of the chassis of an automobile showing the location and general arrangement of my brake operating mechanism, Fig. 2 is an elevation of the left side of the equalizing mechanism shown in Fig. 1, Fig. 3 is a fragmentary detail of the supporting bracket, Fig. 4 is a rear elevation partly in section of the equalizing mechanism, Fig. 5 is a section on the line 5—5 of Fig. 4, Fig. 6 is a section on the line 6—6 of Fig. 2, Fig. 7 is a section on the line 7—7 of Fig. 4, Fig. 8 is an enlarged plan view of the equalizing mechanism, and Fig. 9 is a plan view of a modified form of the equalizing mechanism.

In Fig. 1, the rear wheels of the vehicle are shown at 2 and the front wheels at 4, each of these wheels having an internal brake (not shown) adapted to be operated by a crank arm 6. The crank arms 6 of the rear wheels are connected by rods 8 to a yoke 10 pivoted at its midpoint to a clevis 12, by which it is connected to one end of a lever 14 fixed by a hub 16 to a shaft 18. The crank arms 6 of the front wheels are connected by rods 9 to a yoke 11 pivoted at its midpoint to a clevis 13 by which it is connected to the lower extremity of lever 14. The yoke 10 thus equalizes the rear brakes, and the yoke 11 the front brakes. When the shaft 18 is turned upon its axis in a manner to be described, the upper end of lever 14 moves forward and the lower end rearward, thus tensioning the rear brakes and the front brakes through the equalizer yokes.

In accordance with my invention, the portion of the shaft 18 to which lever 14 is fastened has a positively limited fore-and-aft movement. One way of supporting the shaft for such movement is illustrated in Figs. 2-8. The left end (Fig. 4) of the shaft 18 is journaled in a forked bearing 20 having at its base a bolt 22 supported by a bush 24 in an apertured ear 26 (Fig. 3) of a bracket 28. The lower end of bolt 22 is threaded to receive a castellated nut 30. This bearing mounted in the manner described permits shaft 18 to tilt in a fore-and-aft direction about its end which is journaled in the bearing. The opposite end of shaft 18 is received in a horizontally elongated slot 32 of a vertically extending ear 34 at the opposite end of bracket 28. The shaft 18 is provided on its end with a roller 36 which substantially fills the slot 32 in a vertical direction, but is smaller in diameter than the long dimension of slot 32. Thus the roller 36 guides shaft 18 for tilting movement in a fore-and-aft direction. In accordance with the invention, this tilting movement is positively limited to one of short extent. Any suitable abutment device can be used for this purpose, but in the form shown in the drawings, the ends of slot 32 serve as the limiting means for the tilting movement. In order to exclude dirt from the slot 32, it is covered on the outside by a plate 40 and on the inside by a plate 42 slotted to allow free movement of shaft 18. The slot of plate 42 can be covered by a cap 44 which moves with the shaft and is held against plate 42 by a compression spring 46.

Any suitable means can be applied to the swivelled end of shaft 18 to impart the turning movement which tensions the brake mechanism. In the drawings, an arm 50 is fixed by a hub 52 to shaft 18 between the two parts of the bearing 20. The upper end of arm 50 is slotted to receive one end of a link 54 connected to the arm 50 by a pin 56 and connected at its opposite end by a pin 58 to the forked end of a second arm 60. The arm 60 is fixed by a hub 62 to a shaft 64 mounted in bearings 65 in bracket 28 substantially parallel to shaft 18. Shaft 64 is provided at its opposite end with a fixed arm 66 connected by a rod 68 with a hand brake lever 70. The foot brake lever 72 is connected by a rod 74 to the upper end of arm 60. The bracket 28 is secured by bolts 76 to a cross piece 78 of the main frame 5 of the chassis. A coiled spring 77 on shaft 64 serves to return the parts to their normally released positions upon the release of the brake levers and prevents a sticking of the brakes.

The brake mechanism operates in the following manner:

A pull applied to hand brake lever 70 or push applied to pedal 72 acts through rod 68 or 74 to turn shaft 64. In either case link 54 is pulled forward and pulls with it the upper end of arm 50, turning shaft 18 upon its axis. Lever 14 is thus turned counterclockwise (Fig. 7) and tensions the front and rear brake mechanisms. The latter will be adjusted by well known means to position the shaft 18 normally at about the middle of slot 32, so that upon being turned to tension the brake mechanism, it will be free to assume a position determined by the balance of forces between the front and rear brake mechanisms, thus equalizing the front brakes against the rear brakes. Since the front brakes are equalized between themselves by yoke 11 and the rear brakes by yoke 10, all the brakes will be applied with equal force.

Should one of the rods 9 be broken, the other rod 9 will be released by the freely swinging yoke 11 and the free end of shaft 18 will swing back to the rear end of slot 32. Here it will find a fulcrum about which lever 14 will turn to apply the rear brakes through equalizer yoke 10. Damage to the rear brake mechanism will have a similar, but reverse effect upon the shaft 18, so that the front brake mechanism will remain operative. Breakage of any one brake rod releases the opposite brake rod at the same end of the vehicle and avoids application of more braking force to the wheels of one side than to those of the other side.

Another way of mounting shaft 18 is shown in Fig. 9. Here the shaft is in two sections 80 and 82 coupled by a power transmitting universal joint 84. The section 82 is journaled in stationary bearings 86 on the ear 88 of bracket 90, this shaft section being best held to a stationary axis. The swinging end of shaft section 80 is guided by a roller 36 in a slot 32 of the vertical ear 34 of bracket 90, just as in the first modification. Aside from the mounting of the shaft 80, 82, and the fact that its section 80 tilts about the universal joint 84, there is no difference between this form of the invention and the one first described.

It will be noticed that the vertical dimension of the equalizing mechanism is not substantially greater than the minimum height determined by the necessary length of the lever 14 for tensioning the brake rods. The mechanism is therefore well adapted to fit into the limited space available under the modern car. It will also be noticed that by positioning the shaft 64 somewhat lower than shaft 18, a gain in leverage is secured without increasing the height of the mechanism.

Various modifications can be made without departing from the scope of the invention as defined in the claim which follows.

Having described my invention, I claim:

In combination with four-wheel brakes for vehicles, two yokes respectively equalizing the front pair of brakes and the rear pair of brakes, a rock shaft swivelly mounted at one end and supported at its opposite end to permit limited fore-and-aft swinging movement, a lever fixed to said shaft at a substantial distance from its swivelled end, said lever having arms projecting up and down from said shaft, means connecting the ends of said arms respectively to said yokes, a second shaft parallel to said first shaft, and mounted lower than said first shaft, parallel arms fixed to and extending up from said shafts in the same plane transverse to said shafts, a link connecting said arms and inclined upward from an intermediate point on the arm of said second shaft to the arm on said first shaft, said arm on said second shaft terminating substantially on a level with the top of the upwardly extending arm of said lever, and an operating member connected to the upper end of said arm on said second shaft.

JOSEPH C. EAHEART.